March 28, 1950     W. O. BAKER     2,502,304

METHOD OF FORMING EXPANDED PLASTIC MATERIALS

Filed Dec. 18, 1947

INVENTOR
W. O. BAKER
BY
Edwin B. Cave
ATTORNEY

Patented Mar. 28, 1950

2,502,304

UNITED STATES PATENT OFFICE 2,502,304

METHOD OF FORMING EXPANDED PLASTIC MATERIALS

William O. Baker, Morristown, N. J., assignor to Bell Telephone Laboratories, Incorporated, New York, N. Y., a corporation of New York Application December 18, 1947, Serial No. 792,585

7 Claims. (Cl. 18—48)

This invention relates to a method of making expanded plastic materials.

According to the present invention rigid, lightweight plastic structures are made which are formed of two thin, impervious skins, joined together by a large number of discrete connecting walls and filaments extending between and formed integrally with said skins, the total portion of the volume between said skins occupied by said bridges being small compared to the unoccupied portion.

A need for insulating materials having a low dielectric constant and for light-weight structural materials has stimulated the preparation of plastic structures such as plastic foams in which the greater part of the volume of the structure is taken up by air.

Expanded solid plastics hitherto produced have possessed spongy or foam-like structures and have been prepared by subjecting the plastics while in a fluid condition to the action of chemical blowing agents or mechanical foaming devices. When such materials have been used for structural purposes, the so-called sandwich structure has been used in which the expanded plastic has been placed between and adhered to two outer skins of metal or other strong, durable material. This type of structure has been necessary to impart strength to the expanded plastic and to exclude fluids from its pervious, sponge-like body.

The unreinforced expanded plastics hitherto produced, because of their spongy structure, have been mechanically weak and lacking in durability. The thin walls of the multitude of gas cells making up the spongy structure are easily broken down under mechanical stress. This structural weakness is especially pronounced at the surface of the material where applied mechanical pressure is apt to be localized, creating large local stresses, so that the walls of the surface cells are destroyed. Destruction of the surface cells exposes underlying thin-walled cells which are in turn destroyed by the applied stress.

Morever, the substantially uniform distribution of plastic and gas cells over the entire volume of the material is uneconomical from a structural standpoint since the plastic is not concentrated at the points of greatest stress. Thus there is no reinforcement at the surfaces, where tensile stress due to bending moment is concentrated. In order to obtain a board from these materials which has a reasonable resistance to bending moment, it is necessary to use the sandwich structure referred to above.

All of these disadvantages are avoided and the advantages of the sandwich structure, without the necessity of the use of such a structure, are provided by the expanded plastic bodies of the present invention.

The expanded plastic board of the present invention is made by fusing a portion of plastic material between two platens of a press which are then drawn apart at a temperature near the melting point. When the plastic material cools an expanded structure is obtained having nonporous skins on each surface. These structures have superior strength and resistance to wear, and yet they are approximately as light in weight as the materials of the prior art.

A more comprehensive understanding of the invention may be obtained by reference to the accompanying drawing, in which.

Figure 1:
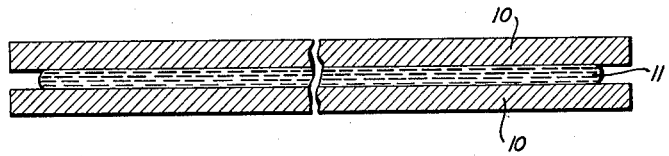
Fig. 1 is a schematic representation in section of two platens of a press having a fused sheet of plastic material placed therebetween.
Figure 2:
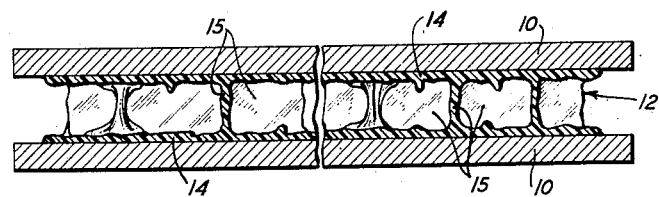
Fig. 2 shows a sectional view of the platens after they have been separated causing an expansion of the plastic material therebetween.

According to the preferred embodiment of the present invention, a portion of plastic material is placed between two platens 10 of a press as shown in Fig. 1, and is heated to a temperature at or above its melting point to form a smooth sheet 11. The platens 10 are then pulled apart, as shown in Fig. 2, for a distance which is determined by the thickness and degree of porosity desired for the final product. The resulting expanded plastic material 12 is then allowed to cool.

Figure 3:
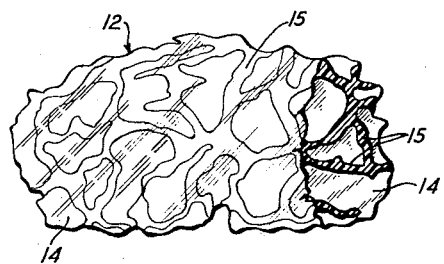
Fig. 3 shows a plan view, partly in section of a fragment of an expanded plastic board, made according to this invention.
Figure 4:
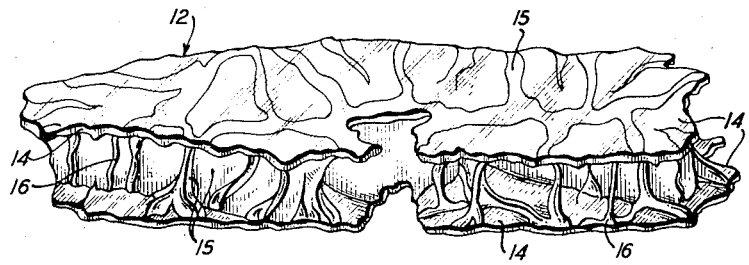
Fig. 4 shows a perspective view of a fragment of an expanded plastic board made according to this invention.

The final product may have the appearance of the articles in Fig. 3 and Fig. 4 in which are shown portions of expanded boards 12 having impervious tough surface skins 14 connected by discrete wall-like bridges 15 and filaments 16.

The plastic in these structures is distributed in such manner as to provide a large degree of structural efficiency, as contrasted with the sponge or foam structure. Thus, the multitude of thin-walled cells is absent. Instead, the free space extends uninterrupted across the distance from skin to skin and is broken only by the wall-like and filamentary bridges which may divide it laterally. As mentioned above, the concentration of plastic in the skins gives the structures a high degree of durability against localized surface stress and a high resistance to bending moment.

The shape which the connecting bridges inherently assume when produced as described approaches the ideal since the bridges are most massive at those points at which the stresses would tend to be concentrated. Thus the points at which the bridges meet the skins, which are the points most susceptible to failure when the structure is stressed, have the greatest cross-section. The cross-section diminishes at points removed from the skins and tends to be the smallest at approximately midway between the two skins. The junctions between the bridges and the skins are inherently filleted and stress concentration is thus reduced.

The device in which the material is expanded may conveniently comprise a press in which the space between the platens is not confined at the edges, so that when the two platens are separated the air rushing in from the sides will cool the expanded plastic. Cooling in this manner usually takes from about 10 to 15 minutes. If desired, the expanded plastic may be quenched such as by circulating water or an organic liquid, maintained at or below room temperature, through the platens. By quenching, the expanded plastic may be cooled to room temperature in one or two minutes.

Quenching tends to make the expanded plastic board stronger because it aids in preserving the walls and filaments which connect the two surfaces. If the structure is slowly cooled there is more likelihood that some of the filaments will collapse under the combined effects of gravity and the surface tension of the melted plastic.

In general the solidified plastics in the present structures have an elongation of about 10 per cent to 15 per cent. With some plastic materials, such as polyamides, quenching tends to make the structure more flexible. If the expanded structures made from polyamides are quenched, the elongation may be as high as 18 per cent to 20 per cent.

Ordinarily enough plastic material should be used to form, when heated, a softened sheet having a minimum thickness of about 50 mils. However, much thicker sheets may be used. The minimum viscosity of the material when the platens are pulled apart should be about 200 poises. The greater the speed with which the two platens are separated the greater the porosity of the structure. The distance between the platens after they are pulled apart may be from four to about twenty-five times the initial distance between the platens, or about one-half a centimeter to about three centimeters for an initial plastic thickness of about 50 mils, although considerably thicker structures may be made if desired. The thickness of the surface skins depends on the viscosity of the particular plastic at the particular temperature used, the thickness of the starting sheet and the rate and degree to which the platens are separated. In a typical case, if a plastic about 50 mils thick is expanded to a thickness of about 1.5 centimeters, the thickness of each surface skin measured over the whole area may lie in the vicinity of about 10 mils.

The resulting density of the structure may be varied by varying the thickness of the starting sheet, the distance and speed with which the platens are pulled apart, and the viscosity of the material when its expansion is carried out. The expanded structure as a whole may have a density as low as one-fifth to one-tenth or one-twentieth, or less of the true density of the starting material. The structure between the two surface skins may comprise as high as 90 per cent to 95 per cent voids by volume.

Either thermoplastic or thermosetting materials may be used in the present process. The materials which may be treated according to the present invention include linear polyamides, such as polyhexamethylene adipamide, polyhexamethylene sebacamide and polydecamethylene sebacamide. These polymers ordinarily should have a weight average molecular weight of at least 10,000 in order to possess the property of cold drawing. Other polymers which may be used are cellulose esters such as cellulose triacetate, cellulose acetate-butyrate, and cellulose acetate-propionate, which may be used with or without plasticizers; normally solid polymers of ethylene or of polystyrene; linear microcrystalline polyesters, preferably of sufficiently high molecular weight to possess the property of cold drawing, such as polyethylene succinate and polyethylene sebacate, which may be used in the thermoplastic form or with curing agents, such as benzoyl peroxide, which render them thermosetting; or phenol formaldehyde resins.

The method is most effectively practiced with the microcrystalline polymers, which have sharp melting points and which more readily undergo molecular orientation leading to higher strength, as discussed below. For this reason, polyethylene, the linear polyamides and the linear polyesters are most suited to the purposes of the present invention. Of these, the polyamides yield the best products.

The present method of expanding plastic materials causes some uniaxial orientation of the molecules forming the partitions and filaments of the mass. Such an orientation confers improved strength on the wall-like elements and filaments which hold the structure together.

If thermosetting materials are used in this process, a rapid curing agent should be employed so that, immediately after the platens are pulled apart, the material cures.

The structures made by the present process may be in the form of flat boards, or they may have a curved shape depending on the shape of the platens used. The surfaces may or may not be parallel to each other. Various other modifications of the invention may be made. For instance, the outer skins of the structure may be made to contain textiles or other laminating materials, or the expanded structure may be used as a member of a laminated structure.

Structures made by the present invention may be used for electrical insulation or as windows in devices used for the propagation of radio waves, as thermal insulators, acoustic insulators, or as elements for building airplanes and other structures.

The following examples may be taken as illustrations of the invention:

*Example 1*

Granules of molding powder of cold drawable polyhexamethylene adipamide having a density of about 1.14 grams per cubic centimeter were melted between the polished steel plates of a press at 300° C. to produce a melt about 50 mils thick. When the melt achieved a homogeneous, honey-like consistency the lower plate was dropped suddenly about 1.5 centimeters causing the polymer to be drawn out in the form of veins and filaments. Cold water running through the plates of the press and cool air rushing in between the plates caused the material to solidify. The expanded plastic structure was then removed from the press, and was found to have a density of approximately 0.16 gram per cubic centimeter, and a dielectric constant of about 1.2.

*Example 2*

Granules of polyethylene were placed between two plates of a metal press and were heated to about 130° C. to 140° C. to form a softened layer of polyethylene about 50 mils thick. The lower plate was then dropped about 2 centimeters to form an expanded polyethylene structure, which was allowed to cool in air. The structure was removed from the plates and was found to be mechanically rigid and strong, with a density about one-tenth of that of the original material, and a low dielectric constant.

It is to be understood that the form of the invention herewith shown and described is to be taken as a preferred example of the same, and that various changes may be made in the method, and that known chemical equivalents may be employed without departing from the spirit of the invention or the scope of the subjoined claims.

What is claimed is:

1. A method of making a rigid, light-weight board made up of two thin, impervious, spaced skins separated and joined together by integrally formed connecting bridges, said method comprising forming between two spaced plates a softened body of a plastic material adhering to said plates, said plastic material being capable of being drawn in its softened state into filamentary and film-like bridges, drawing said plates apart while said plastic material is in a softened state for a distance sufficient to cause said plastic material to be drawn out into the form of a body formed of two thin continuous skins of said plastic material, each adhering to the inner surface of one of said plates, said skins being joined by connecting bridges of said plastic material integrally formed with said skin, said body being so proportioned that when cool it is a structurally rigid board, cooling said plastic material in said form and removing the plastic board thus formed from said plates.

2. A method as described in claim 1 wherein the plastic material when in the softened state in which it is drawn possesses a viscosity of at least about two hundred poises and wherein the distance to which the plates are drawn apart is between four times and twenty-five times the initial distance between the plates.

3. A method as described in claim 1 wherein the plastic material is a microcrystalline linear polyamide having a weight average molecular weight in excess of 10,000 and wherein the distance to which the plates are drawn apart is between four times and twenty-five times the initial distance between the plates.

4. A method as described in claim 1 wherein the plastic material is polyhexamethylene adipamide having a weight average molecular weight in excess of 10,000 and wherein the distance to which the plates are pulled apart is between four times and twenty-five times the initial distance between the plates.

5. A method as described in claim 1 wherein the plastic material is polyethylene.

6. A method as described in claim 1, wherein the plastic material is a cellulose ester.

7. A method as described in claim 1 wherein the plastic material is cellulose triacetate.

WILLIAM O. BAKER.

REFERENCES CITED

The following references are of record in the file of this patent:

UNITED STATES PATENTS

| Number | Name | Date |
|---|---|---|
| 1,024,783 | Johannes | Apr. 30, 1912 |
| 2,256,483 | Johnson | Sept. 23, 1941 |
| 2,355,744 | Myers | Aug. 15, 1944 |
| 2,371,868 | Berg et al. | Mar. 20, 1945 |
| 2,376,653 | Boyer | May 22, 1945 |